United States Patent
Forst et al.

(10) Patent No.: US 6,513,410 B2
(45) Date of Patent: Feb. 4, 2003

(54) TOOL HOLDER FOR MACHINE TOOLS AND TOOL SYSTEM FOR MACHINE TOOLS

(75) Inventors: Heinz Forst, Aichwald (DE); Rainer Koeneke, Kirchheim/Teck (DE); Werner Sonnek, Lichtenwald (DE)

(73) Assignee: Traub Drehmaschinen GmbH, Reichenbach (DE)

( * ) Notice: Subject to any disclaimer, the term of this patent is extended or adjusted under 35 U.S.C. 154(b) by 0 days.

(21) Appl. No.: 09/749,724

(22) Filed: Dec. 27, 2000

(65) Prior Publication Data

US 2001/0039705 A1 Nov. 15, 2001

Related U.S. Application Data

(63) Continuation of application No. PCT/EP00/03718, filed on Apr. 26, 2000.

(30) Foreign Application Priority Data

Apr. 28, 1999 (DE) .......................................... 199 19 236

(51) Int. Cl.[7] .......................... B23B 29/00; B23B 29/04
(52) U.S. Cl. ............................ 82/159; 82/161; 82/158; 82/121
(58) Field of Search .......................... 82/159, 160, 161, 82/121, 173, 158; 407/30, 34, 35, 41, 45, 46, 47, 49, 53

(56) References Cited

U.S. PATENT DOCUMENTS

| | | | |
|---|---|---|---|
| 5,186,476 A | | 2/1993 | Heel et al. |
| 5,507,170 A | * | 4/1996 | Kawano .................. 72/482.91 |
| 5,816,301 A | * | 10/1998 | Stager ......................... 144/228 |
| 5,848,858 A | * | 12/1998 | Jager et al. .................... 407/34 |
| 6,003,415 A | * | 12/1999 | Turner et al. .................. 82/159 |
| 6,230,595 B1 | * | 5/2001 | Kranjac ........................ 82/159 |
| 6,270,293 B2 | * | 8/2001 | Erickson et al. ............. 407/101 |
| 6,325,574 B1 | * | 12/2001 | Treige ........................... 407/35 |

FOREIGN PATENT DOCUMENTS

| | | |
|---|---|---|
| DE | 40 28 775 | 7/1991 |
| EP | 0 799 663 | 10/1997 |

* cited by examiner

Primary Examiner—Henry Tsai
(74) Attorney, Agent, or Firm—Barry R. Lipsitz

(57) ABSTRACT

The invention provides a tool support for machine tools comprising a base unit, a holding member arranged on the base unit and two supporting surfaces extending at an acute angle to one another arranged on the holding member for supporting a tool holder in first and second supporting areas. A clamping device acts on a clamping member of the tool holder such that the tool holder acts upon the supporting surfaces with the two supporting areas. The clamping element may be mounted in the holding member for rotation about an axis and bear a wedge surface movable around the axis for acting on the clamping member. The wedge surface of the clamping element may engage over the clamping member proceeding from an insert position during the rotation of the clamping element in a first direction of rotation and displace the clamping member increasingly in the clamping direction.

36 Claims, 6 Drawing Sheets

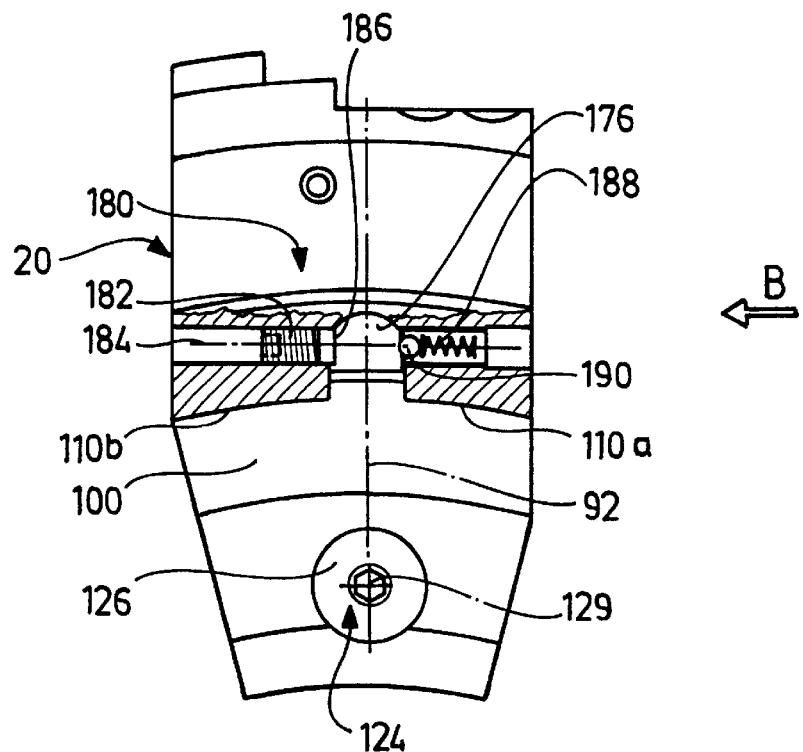
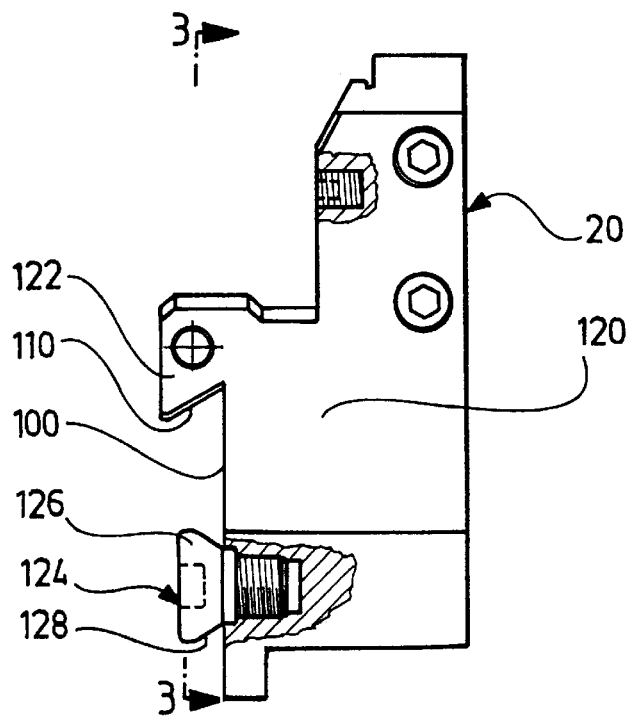

TOOL HOLDER FOR MACHINE TOOLS AND TOOL SYSTEM FOR MACHINE TOOLS

This is a continuation of application No. PCT/EP00/032718, filed Apr. 26, 2000.

BACKGROUND OF THE INVENTION

The invention relates to a tool support for machine tools comprising a base unit, a holding member which is arranged on the base unit and on which two supporting surfaces extending at an acute angle to one another are arranged for supporting a tool holder in a first supporting area and a second supporting area, and a clamping device for acting on a clamping member of the tool holder in a clamping direction extending in such a manner that the tool holder acts upon the supporting surfaces with the first and the second supporting areas.

Tool supports of this type are known, for example, from EP 0 799 663.

With this solution, the clamping device is, however, provided with a tightening screw which is complicated to actuate.

The object underlying the invention is therefore to improve a tool support of the generic type in such a manner that clamping of a tool holder is possible in as simple a way as possible.

SUMMARY OF THE INVENTION

This object is accomplished in accordance with the invention, in a tool support of the type described at the outset, in that the clamping element is mounted in the holding member for rotation about an axis and bears a wedge surface movable on a path around the axis for acting on the clamping member and that the wedge surface of the clamping element engages over the clamping member proceeding from an insert position during the rotation in a first direction of rotation and acts upon this clamping member so as to displace it increasingly in the clamping direction.

The advantage of the inventive invention is to be seen in the fact that with it it is possible to clamp the tool holder in a simple manner since a rotation of the clamping element through less than 360° is adequate to clamp the clamping member by means of the clamping device.

As a result, a clamping of the tool holder can be realized with a simple rotary movement of the clamping element.

In principle, it is possible to arrange the clamping element at any optional location. In order to be able to act on the tool holder in a particularly simple manner and, in particular, to ensure a simple insert movement of the tool holder without the clamping element being arranged, for example, on the drive side of the tool holder, it is provided for the clamping element to be arranged in an area of the holding member bearing the supporting surfaces.

A particularly advantageous arrangement of the clamping element provides for this to be arranged in the holding member on a side of one of the supporting surfaces located opposite the tool holder.

The rotatable mounting of the clamping element can be brought about in the most varied of alignments thereof. One advantageous solution provides for the clamping element to be rotatable about an axis extending transversely to the supporting surface.

The mounting of the clamping element is favorably brought about such that this is rotatably mounted in a bore passing through the holding member.

With respect to the arrangement of the clamping link member, the most varied of possibilities are conceivable. One advantageous type of arrangement provides for the clamping element to be movable in such a manner that the wedge surface crosses the insert path of the clamping member.

In this respect, it is particularly favorable when the wedge surface, in the insert position of the clamping element, is arranged outside an insert path of the clamping member which this describes during the insertion of the tool holder into the tool support and when the wedge surface extends transversely to this insert path with the area acting upon the clamping member following rotation of the clamping element in the first direction.

As a result, the tool holder may be inserted in a particularly simple manner and this insertion also takes place without hindrance and allowance for the wedge surface used for the clamping.

It is particularly advantageous when the adjusting clamping element is arranged such that it is in a position to act on the clamping member which can be introduced in an entry channel arranged in the holding member so as to be recessed in relation to one of the supporting surfaces.

A particularly favorable solution for the insertion of the tool holder provides for the holding member to be designed such that it allows a straight insert path for the clamping member and thus for the tool holder, as well.

In this respect it is particularly favorable when the insert path extends parallel to one of the supporting surfaces.

With respect to the rotary movement which is necessary in order to clamp the tool holder, it has merely been assumed thus far that a rotation of the clamping element through less than 360° is necessary. It is particularly favorable when the clamping element is rotatable through an angle of less than 270°, even better of less than 180°, for the clamping of the tool holder.

So far, it has not been discussed in detail how the wedge surface is intended to be designed and arranged on the clamping element. A particularly advantageous constructional solution provides for the clamping element to comprise a clamping link member bearing the wedge surface.

In this respect, the clamping link member is preferably designed to be bent in the shape of a sickle so that, accordingly, the wedge surface is also bent in the shape of a sickle and can be brought into abutment on the clamping member in a simple manner by way of rotation of the clamping element.

In order, in particular, to facilitate the insertion of the tool holder, it is preferably provided for the clamping element to have a recess which is located in front of an initial area of the clamping link member and through which the clamping member can be brought into the operative area of the clamping link member during its movement in insert direction. In this respect, the clamping link member is preferably not designed as a link member closed in a circular shape but rather has on one side an opening which is preferably arranged so as to be aligned with the insert path of the clamping member when the clamping element is in an insert position.

In principle, it would be conceivable with the inventive solution to form the clamping link member on an outer casing surface of a rotatable member, for example, in the form of a ridge with a wedge surface located so as to face away from the member.

A particularly favorable solution from a constructional point of view which is particularly space-saving does, however, provide for the clamping link member to bear the wedge surface on a side facing the axis of the clamping element.

A particularly simple solution for the production of a clamping element provides for the clamping element to comprise a hollow cylinder which forms the clamping link member with a wall section, wherein, particularly in the case of a recess in front of the initial area of the clamping link member, the wall section is not a closed, cylindrical wall section but rather extends only over an angular area of less than 360°.

It is particularly favorable for a secure clamping of the tool holder when the wedge surface is designed as a self-locking wedge surface.

With respect to the alignment of the supporting surfaces and the clamping element relative to one another, no further details have so far been given. In principle, there are no limitations as long as the clamping member can be brought into the operative area of the clamping element.

One particularly favorable solution provides for the supporting surfaces and the clamping element to be arranged relative to one another in such a manner that the tool holder can be abutted with the first and the second supporting areas on the corresponding supporting surfaces due to a movement along a straight insert path and can be brought into the operative area of the clamping element with the clamping member.

Constructionally, this may be realized in any optional manner. For example, it would be conceivable for the clamping element to project beyond one of the supporting surfaces and, for example, for the corresponding supporting area of the tool holder to be subdivided into two sections.

A particularly favorable solution provides for one supporting surface of the holding member to have partial surfaces which are located on both sides of an entry channel for the clamping member extending in the entry direction.

In order to be able to give the entry channel for the clamping member as great a length as possible it is preferably provided for both supporting surfaces of the holding member to be divided and for each of the supporting surfaces to have partial surfaces located on both sides of the entry channel for the clamping member.

With respect to the course of the clamping direction, no further details have been given in conjunction with the preceding explanations concerning the individual embodiments. It would, for example, be conceivable to have the clamping direction extending either parallel to the one supporting surface or parallel to the other supporting surface. In order to ensure a secure abutment on both supporting surfaces acted upon where possible with high forces it is preferably provided for the clamping direction to extend parallel to a direction which is located within the angular area limited by the supporting surfaces. In this respect, the clamping direction preferably extends in such a manner that it is aligned approximately parallel to an angle bisector of the angle between the supporting surfaces.

So that an exact alignment of the holding member is possible, this is preferably provided with at least one measurement surface aligned parallel to the X direction of the respective machine tool, wherein one of the supporting surfaces preferably forms the measurement surface.

With respect to the construction of the inventive tool support, no further details have so far been given. It would, for example, be conceivable to connect the holding member and the base unit securely to one another by way of joining.

A particularly favorable solution does, however, provide for the holding member to be connected in a force-locking manner to the base unit. This solution has the advantage that, for example, in the case of a collision of a tool borne by the holding member in the machine tool the holding member has the possibility of moving relative to the base unit which is arranged either stationarily on the machine tool or stationarily on a slide of the machine tool and thus extensive damage, for example, in the area of the base unit or the mounting device of the base unit on a slide is avoided. In addition, the force-locking connection has the possibility that this can be released in order to again fix the holding member in the desired alignment in relation to the base unit in a force-locking manner.

However, in order to obtain a defined alignment of the holding member relative to the base unit despite the force-locking connection of the two with one another it is preferably provided for the base unit and the holding member to be alignable relative to one another in a defined manner by way of form elements and for the form-locking elements to be fixed in a force-locking manner against any relative movement in relation to one another. As a result, a defined alignment is possible, on the one hand, by means of the form-locking elements; on the other hand, a shifting of the holding member in relation to the base unit is still possible due to a relative movement of the form-locking elements in relation to one another whilst overcoming the force locking between them.

A particularly favorable possibility for generating a force-locking connection between base unit and holding member provides for the base unit and the holding member to be fixed on one another in a force-locking manner by means of clamping claws engaging on the base unit and on the holding member.

In order to achieve an optimum clamping of base unit and holding member, an inclined surface is preferably provided in the area of at least one point of engagement of the clamping claws and the clamping claws generate a force effecting the force locking by means of this surface.

In principle, it would be conceivable to construct a linear tool support, for example, from the base unit and the holding member, wherein the individual tool holders are seated on the holding member and during a collision the holding member is displaced relative to the base unit.

A particularly advantageous type of inventive tool support provides for the base unit to be designed as a support shaft and the holding member as a tool disk of a tool turret.

It is particularly advantageous when providing a support shaft and a tool disk for these to be positionable in a defined manner relative to one another with respect to the axis of rotation of the turret by means of form-locking elements not only in an axial direction in relation to the axis of rotation but also in a radial direction in relation to the axis of rotation and for the force-locking connection between the tool disk and the support shaft to relate merely to the non-rotatable connection between the two so that during a collision a relative turning of the tool disk in relation to the support shaft takes place.

It is particularly favorable with this solution when the support shaft is designed as a hollow shaft and when the clamping claws are operative in a radial direction of the hollow shaft in order to clamp the tool disk and the hollow shaft in an axial direction.

In order to obtain as good a force locking as possible it is particularly favorable when the clamping claws are formed as parts of a profiled ring.

A particularly advantageous possibility for clamping the clamping claws provides for a clamping element for these to be accessible from outside the hollow shaft.

Apart from the provision of a tool support, a solution of the inventive object provides, in addition, for a tool holder which comprises a tool holder housing with two supporting areas extending on this housing at an acute angle to one another, these supporting areas being adapted to abut on two supporting surfaces of a holding member of a tool support, wherein, in accordance with the invention, the tool holder housing is provided with a clamping member which is preferably arranged on the tool holder housing such that a clamping element of the tool support can act on it.

The clamping member is arranged, in particular, such that it projects from one of the supporting areas away from the tool holder housing.

One particularly advantageous design of the clamping member for the inventive tool holder provides for the clamping member to have a head with a contact surface tapering conically towards the tool holder housing.

Such a head allows the possibility of acting upon the tool holder housing such that both supporting areas abut on the supporting surfaces provided on the tool support in a manner acted upon with a force.

A particularly advantageous solution provides for a first one of the supporting areas to be formed by a plane surface of the tool holder housing.

Alternatively or in addition thereto, a further, advantageous embodiment provides for the second supporting area to be formed by a surface arranged on a nose of the tool holder housing.

In order to achieve in an advantageous manner as defined an alignment of the tool holder as possible relative to the tool support, it is advantageously provided for the second supporting area to be divided into two sections so that as a result of the two-sectioned second supporting area and the first supporting area the possibility of a so-called "three-point contact" for the clearly defined fixing of the tool holder on the tool support is given.

A particularly advantageous design of the inventive tool holder provides for this to be provided with an aligning device which can be brought into interaction with an aligning element on the tool support.

With such an aligning device it is possible to predetermine a defined orientation of the tool holder in an adjustable manner.

This can be achieved particularly favorably when the aligning device comprises a preadjustable element.

The inventive tool holder is preferably designed such that it can be placed on a tool support in accordance with one of the embodiments described above.

The invention relates, in addition, to a tool system, comprising a tool holder with a tool holder housing which has a first and a second supporting area, which extend at an acute angle to one another and can be abutted on corresponding supporting surfaces of a holding member of a tool support, and which bears a clamping member, on which a clamping device of the tool support acts during the clamping of the tool holder on it, wherein, in accordance with the invention, the tool support is designed in accordance with any one of the preceding embodiments.

A particularly advantageous design of such a tool system provides for the holding member to be provided with an aligning element for the exact positioning of the tool holder in the respective station and for the tool holder to have an aligning device which can be brought into engagement with the aligning element so that an exact position of the tool holder relative to the holding member can be determined by means of the aligning device in cooperation with the aligning element.

A particularly favorable solution provides for the aligning device to be connected to a preadjustable adjusting element which interacts with the aligning element in order to obtain an exact alignment in accordance with the preliminary setting.

Additional features and advantages of the invention are the subject matter of the following description as well as the drawings illustrating several embodiments.

BRIEF DESCRIPTION OF THE DRAWINGS

FIG. 3 shows a section through a tool holder along line 3—3 in FIG. 4;

FIG. 4 shows a plan view of a tool holder in the direction of arrow B in FIG. 3;

DETAILED DESCRIPTION OF THE INVENTION

Figure 1:
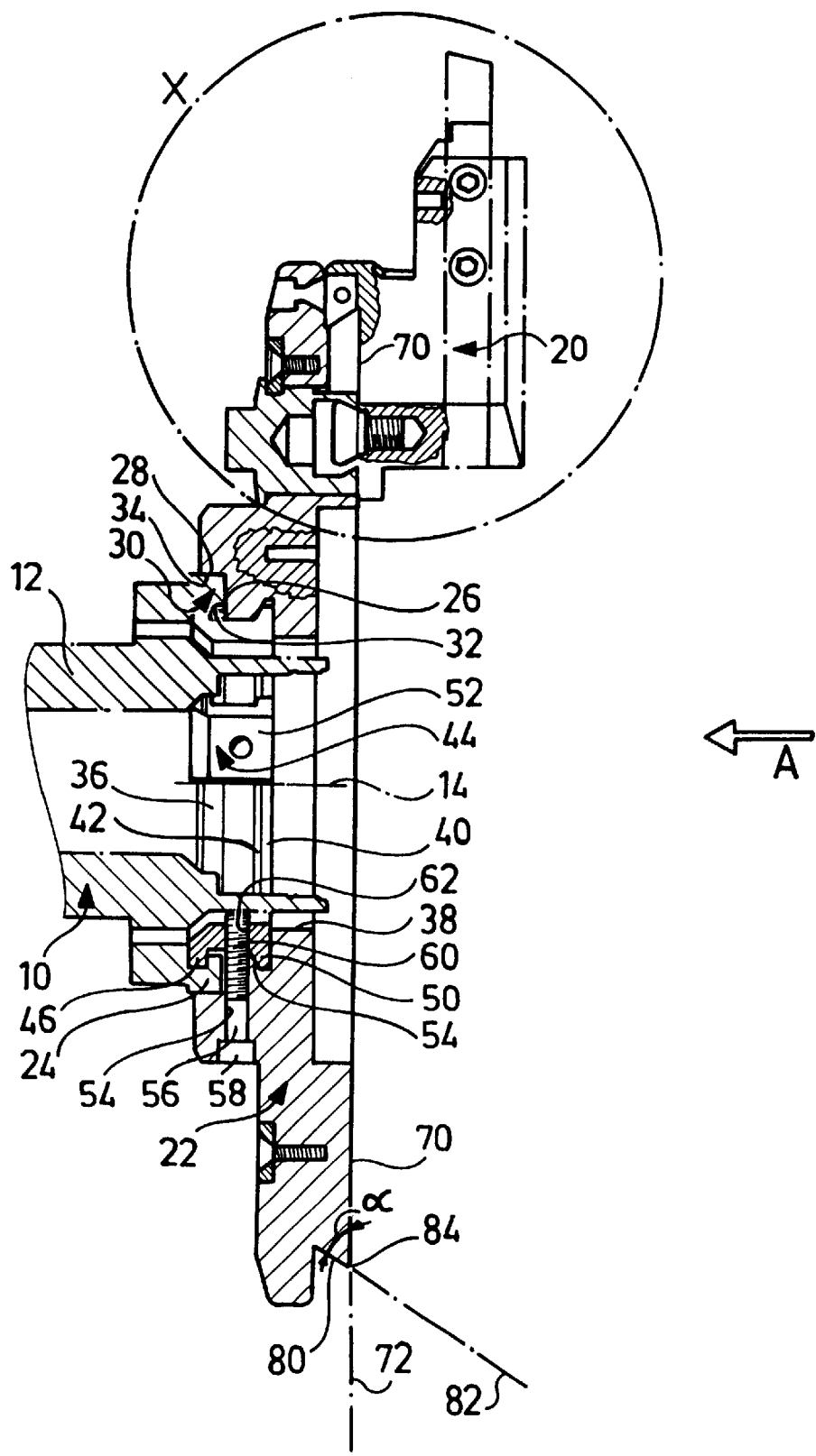
FIG. 1 shows a section through a tool support along line 1—1 in FIG. 2 with a tool holder mounted but no aligning element present.

One embodiment of an inventive tool system illustrated in FIG. 1—designed as a turret—comprises a base unit designated as a whole as 10 which is held on a tool support mounting device, for example, as a support shaft 12 rotatable about an axis 14. A tool disk 22 is detachably held on the base unit 10 as holding member for tool holders 20.

For holding the tool disk 22 the base unit 10 is provided with a support flange 24 which has an end surface 26 located in a plane at right angles to the axis 14 and a casing surface 28 extending azimuthally around the axis 14 and preferably designed to be circular-cylindrical in relation to the axis 14. The support flange 24 engages in a support flange receiving means 30 of the tool disk 22 which is of a step-like design and has a base surface 32, which likewise extends in a plane at right angles to the axis 14 and can be abutted on the end surface 26 of the support flange 24, as well as a centering surface 34 which extends azimuthally around the axis 14 and is preferably designed as a casing surface of a circular cylinder and can be abutted on the casing surface 28 of the support flange 24.

The end surface 26 and the casing surface 28 as well as the base surface 32 and the centering surface 34 are preferably designed such that the support flange 24 is accommodated in the support flange receiving means 30 by means of a form fit and thus the tool disk 22 is held in a precise alignment relative to the base unit 10.

In order to fix the tool disk 22 non-rotatably on the base unit 10, a holding groove 36 open towards the axis 14 is arranged on an inner side of the support flange 24 facing the axis 14 and a holding groove 40 likewise open towards the axis 14 is arranged in the area of a central passage 38 in the tool disk 22 close to the support flange receiving means 30, wherein both holding grooves 36 and 40 extend at approximately the same radial distance from the axis 14 in the base unit 10 and the tool disk 22, respectively.

In this respect, one of the holding grooves 36 or 40, in the case illustrated in FIG. 1 the holding groove 40, preferably has an inclined wall surface 42 facing the other holding groove 36 so that the holding groove 40 widens towards the axis 14.

Clamping claws 44, which have fingers 46 and 50 which engage in the holding grooves 36 and 40, respectively, and project from a clamping claw member 52, can be brought into engagement with the holding grooves 36 and 40.

In this respect, at least the finger 50 engaging in the holding groove 40 is provided with an inclined surface 54 which is located so as to face the finger 46 and can be abutted on the inclined groove wall 42 of the holding groove 40. In this respect, the fingers 46 and 50 are designed and aligned relative to one another such that any pressing of the fingers 46 and, in particular, of the finger 50 into the holding grooves 36 and 40, respectively, due to the clamping claw member 52 being acted upon in a direction pointing outwards radially to the axis 14 leads to a force-locking, non-rotatable connection between the base unit 10 and the tool disk 22 since the end surface 26 and the base surface 32 are clamped against one another.

In order to act upon the clamping claws 44 outwards in a radial direction in relation to the axis 14, the tool disk 22 is provided with bores 54 which extend in a radial direction in relation to the axis 14 and have tightening screws 56 passing through them, the head 58 of which is located on a side opposite the clamping claws 44 and is accessible from an outer side of the tool disk 22 and the threaded section 60 of which can be screwed into a threaded section 62 in the clamping claw member 52 so that the clamping claws 44 can be clamped with these tightening screws 56 radially to the axis 14 outwards against the tool disk 22.

The clamping claws 44 are preferably produced as segments of a ring member with ring beads forming the fingers 46, 50.

With this solution it is possible, on the one hand, for the tool disk 22 to be held on the base unit 10 in a form-locking and exactly aligned manner in a radial direction in relation to the axis 14 and with respect to any tilting in relation to the axis 14 via the support flange receiving means 30 interacting with the support flange 24 while the non-rotatable connection between the base unit 10 and the tool disk only takes place in a force-locking manner so that during a collision of the tool support within the machine tool, for example, a collision of one of the tool holders 20 with other parts of the machine tool it is possible for the tool disk 22 to turn in relation to the base unit 10 on account of a release of the force-locking, non-rotatable connection and thus damage in the area of the base unit 10 can be prevented and after release of the tightening screws 56 a renewed exact alignment of the rotary position of the tool disk 22 relative to the base unit 10 can take place.

To receive the tool holders 20, the tool disk 22 comprises for each tool holder 20 a first supporting surface 70 which is located in a plane 72 which extends, in this case, at right angles to the axis 14.

Furthermore, the tool disk comprises for receiving each tool holder 20 a second supporting surface 80 which represents a section of a casing surface 82 of a cone radially symmetrical and coaxial to the axis 14, this section extending in a ring shape and azimuthally around the axis 14, and thus extends at an acute angle a in relation to the first supporting surface 70. The first supporting surface 70 preferably extends in a radial direction in relation to the axis 14 as far as a circular boundary line 84 around the axis 14 which is located on the conical surface 82 and also limits the second supporting surface 80.

Figure 2:
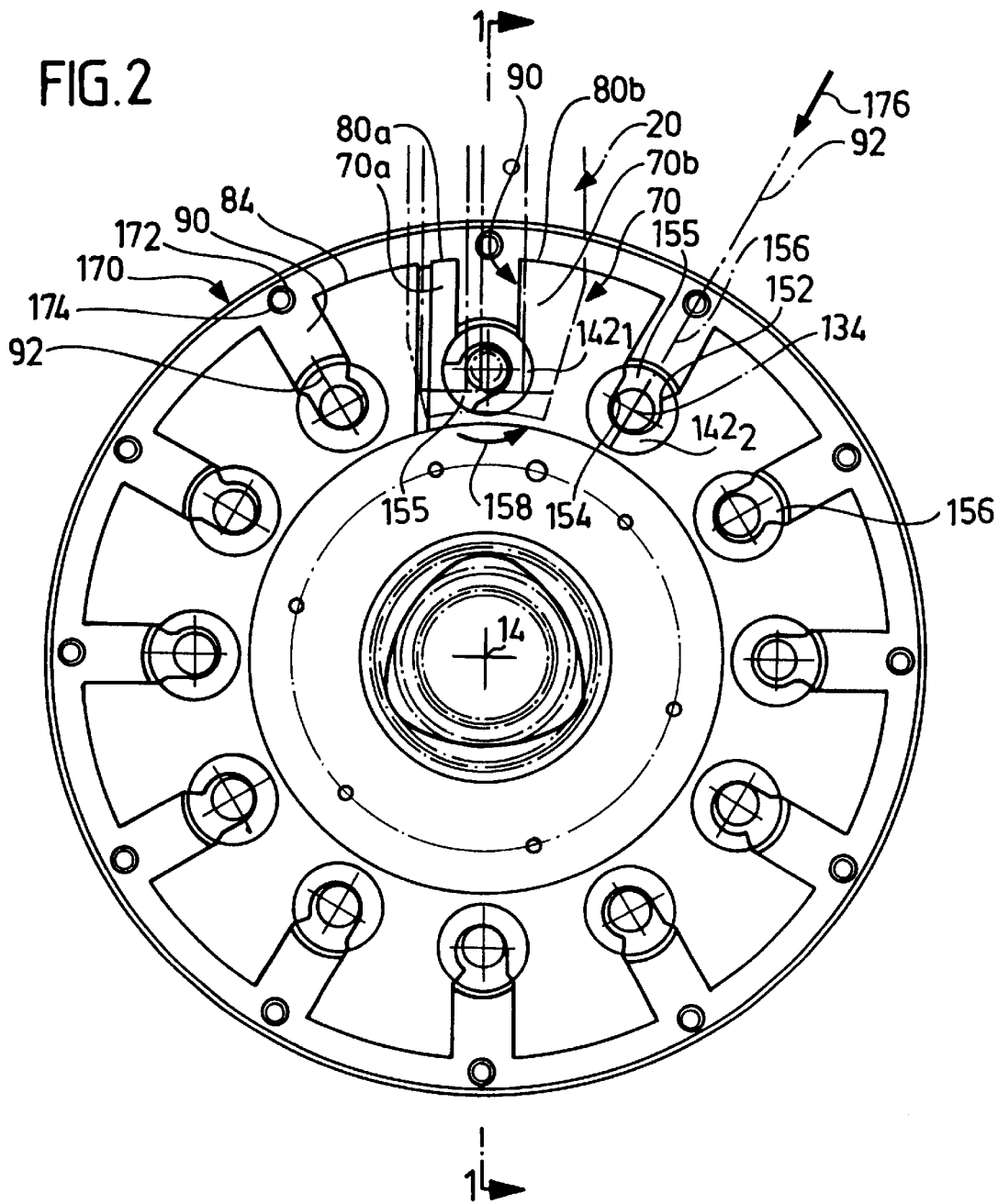
FIG. 2 shows a plan view in the direction of arrow A in FIG. 1 of an inventive tool support with a tool holder mounted.

As illustrated in FIG. 2, the first supporting surface 70 for each of the tool holders 20 is divided in two into a supporting surface 70a and a supporting surface 70b which are located on both sides of an entry channel 90 arranged so as to be recessed in relation to the supporting surface 70 and, in addition, the second supporting surface 80 is also separated by the entry channel into two partial surfaces 80a and 80b.

Each of the tool holders 20 has, as illustrated in FIGS. 1, 3 and 4, a first supporting area 100 which can be abutted on the first supporting surface 70, in particular, the two partial surfaces 70a and 70b as well as a second supporting area 110 which is subdivided into two sections 110a and 10b.

In this respect, the first supporting area 100 is preferably a plane surface which is provided on a tool holder housing 120 and the second supporting area 110 is preferably formed by an inclined surface which extends at an acute angle a to the plane surface 100 and is arranged on a nose 122 of the tool holder housing 120 and which represents, in particular, a section from a conical surface corresponding to the conical surface 82.

The tool holder 20 can thus be placed on the supporting surfaces 70 and 80 with its tool holder housing 120 such that its supporting areas 100 and 110 preferably rest areally on the corresponding supporting surfaces 70 and 80, respectively, in order to achieve a stable support for the tool holder housing 120 on the tool disk 22.

In addition, the tool holder housing 120 is provided with a clamping member 124 which is preferably arranged on the tool holder housing 120 on a side of the first supporting area 100 located opposite the second supporting area 110, projects from the first supporting area 100 away from the tool holder housing 120 and thereby has a head 126 which has a contact surface 128 tapering conically towards the tool holder housing 120.

Figure 5:
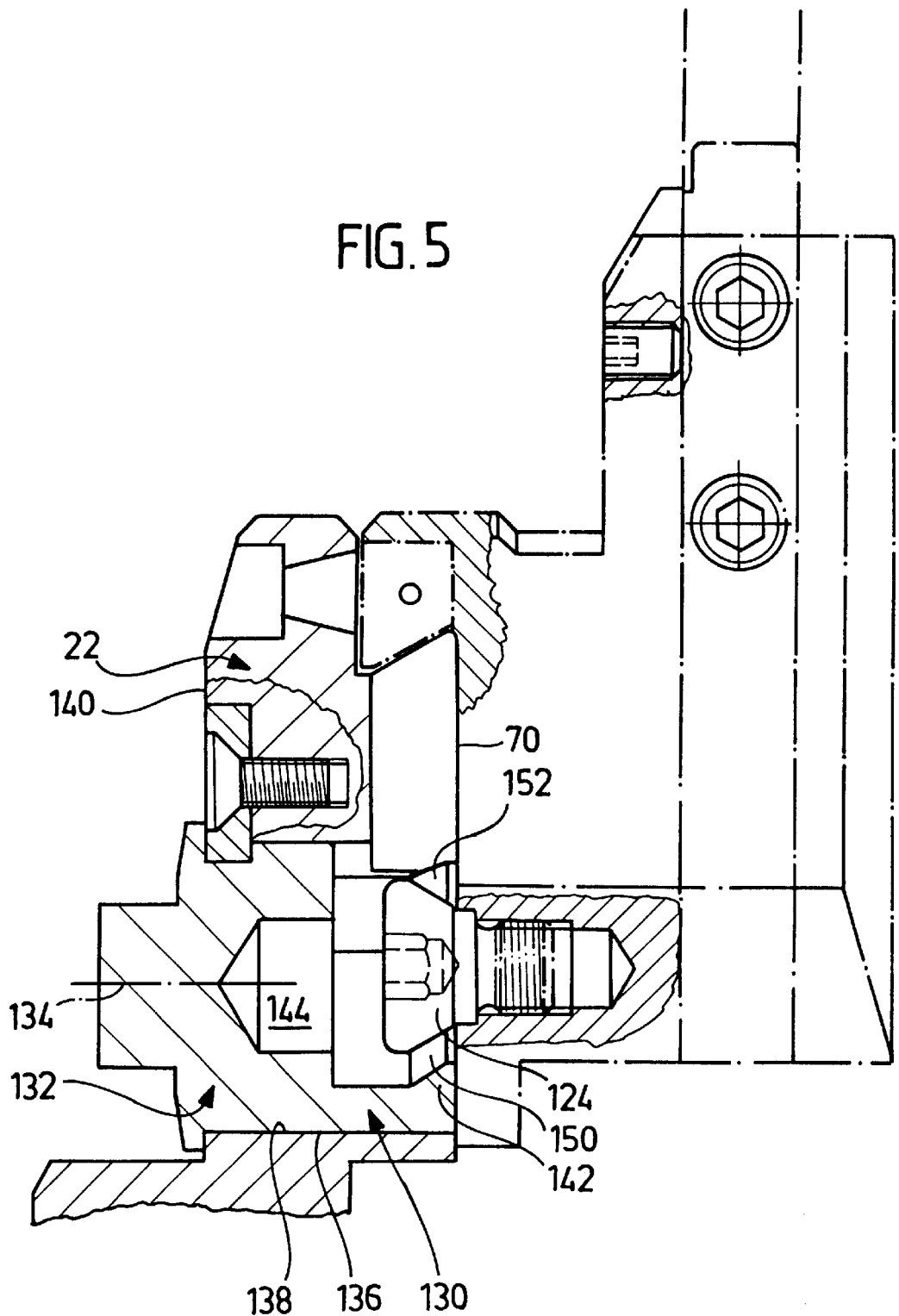
FIG. 5 shows an enlarged illustration of an area X in FIG. 1 with a clamping element in an insert position.
Figure 6:
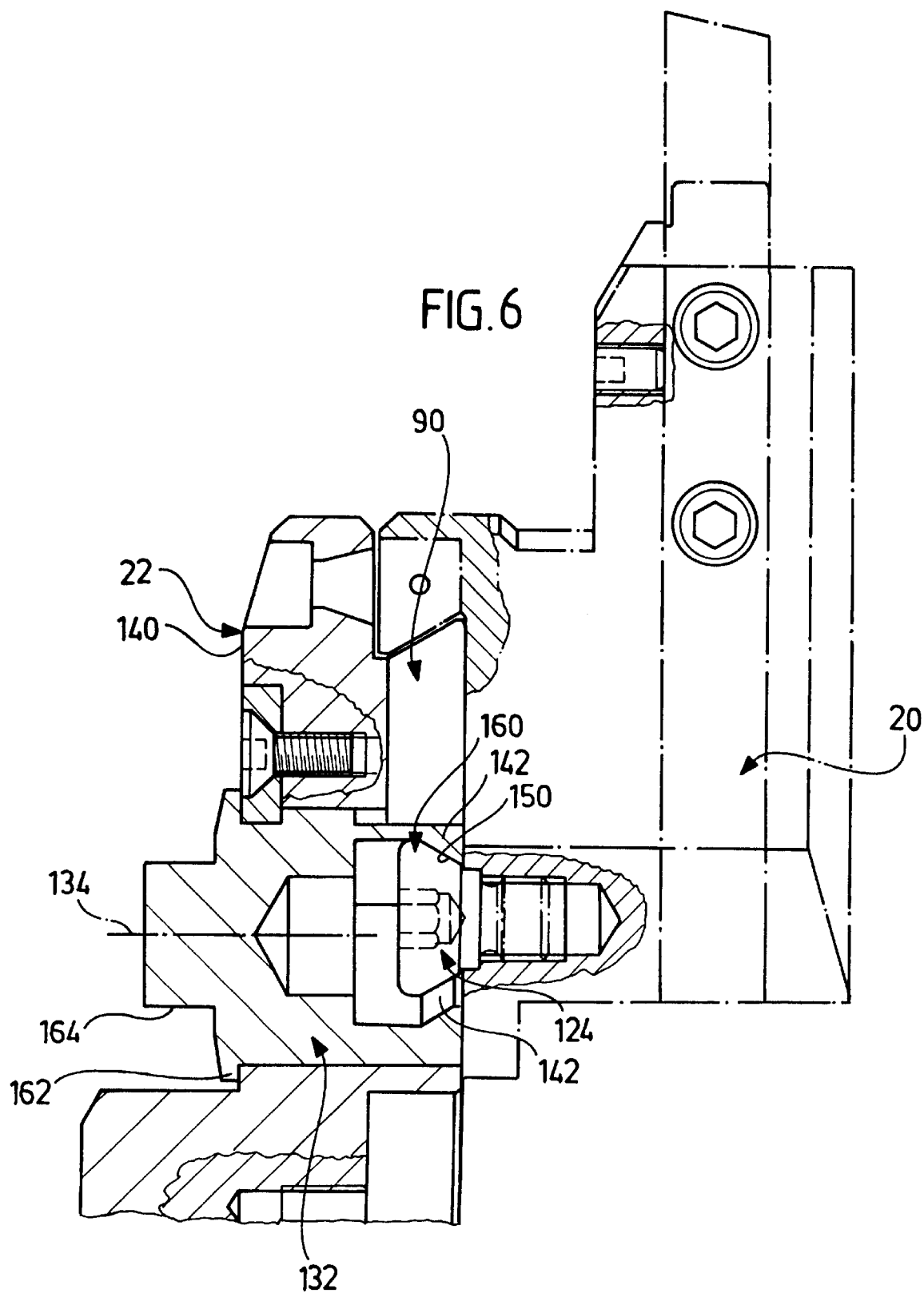
FIG. 6 shows an illustration according to FIG. 5 with a clamping element clamping the tool holder.

As illustrated in FIGS. 1 and 2 as well as on an enlarged scale in FIGS. 5 and 6, the clamping member 124 can be introduced into a clamping device which is designated as a whole as 130 and comprises a clamping element 132 which has an outer casing surface 136 cylindrical to an axis of rotation 134 and is seated with this cylindrical outer casing surface 136 in a bore 138 which extends from a rear side 140 of the tool disk 22 through this as far as the first supporting surface 70.

The clamping element 132 has, in addition, a clamping link member 142 which is arranged so as to face the supporting surface 70, extends around an interior 144 in the clamping element 132 arranged around the axis of rotation 134 and has a wedge surface 150 which extends in the shape of a sickle around the interior 144 and, proceeding from an initial area 152 of the clamping link member 142, has a radial distance becoming increasingly smaller with increasing extension in azimuthal direction about the axis of rotation 134, this distance being minimal at an end area 154 of the clamping link member 142.

"Furthermore, as illustrated, in particular, in FIG. 2, the clamping link member 142 (i.e. clamping link member $142_1$ and clamping link member $142_2$) is uninterrupted in azimuthal direction between the initial area 152 and the end area 154 thereof and forms an entry opening 155 for the clamping member 124 which faces the entry channel 90 in an insert position of the clamping element 132 and is aligned with this channel, as illustrated in FIG. 2 with the clamping link member 142$_2$, so that the clamping member 124 can be introduced through the entry channel 90 into the inner area 144 of the clamping element 132 along an insert path 156 extending radially to the axis 14 (illustrated in conjunction with the clamping link member 142$_2$ in FIG. 2). By turning the clamping element 132 from the insert position, in which the entry opening 155 is aligned with the entry channel 90, in a first direction of rotation 158, the wedge surface 150, which likewise extends conically to the axis of rotation 134 at the same angle as the contact surface 128 of the clamping member 124, crosses the insert path 156, comes to rest on the clamping member 124 and acts via the contact surface 128 on the clamping member 124 in the direction of a clamping direction 160, illustrated in FIG. 6, wherein the clamping link member 142 with the wedge surface 150, on the one hand, displaces the clamping member 124 in a radial direction in relation to the axis 14 and, on the other hand, draws it, in addition, into the adjusting element 132 in the direction of the axis of rotation 134."

So that the clamping element 132 can act on the clamping member 124 in the direction of the axis of rotation 134, this is supported, in addition, on the rear side 140 of the tool disk 22 with an outer ring flange 162.

Furthermore, the adjusting element 132 is provided with key surfaces 164 which project beyond the rear side 140 of the tool disk 22 and via which the clamping element 132 can be acted on with a corresponding key in order to rotate the same in order to act on the clamping member 124 in clamping direction 160.

As illustrated in FIG. 2 in conjunction with the clamping link member 142$_1$, the respective tool holder is clamped with a rotation of the clamping element 132 which is preferably less than 270°, even better less than 180°.

In order, in addition, to ensure that the clamping element 132 is not released in its position respectively turned and acting upon the clamping member 124, the wedge surface 150 is preferably provided with a gradient which brings about a decreasing radial distance from the axis of rotation 134 and corresponds at a straight angle to a wedge angle which is smaller than a wedge angle of the self-locking mechanism.

In order, in addition, to be able to position the tool holders 20 exactly in the position provided for them in an azimuthal direction in relation to the axis 14, preferably a tool holder station, an aligning element 172, which preferably has a circular-cylindrical casing surface 174, is associated with each such tool holder station.

When a tool holder housing 120 is placed on the tool disk 22, this aligning element 172 engages in a recess 176 of this housing which is arranged between the sections 110a and 10b of the second supporting area 110 and extends outwards radially to the axis 14.

The recess 176 is part of an aligning device 180 which has an adjusting screw 182 which is located on one side of the recess 176, the longitudinal axis 184 of which extends in an approximately azimuthal direction and which acts on the casing surface 174 of the aligning element 172 with an end surface 186. A member 190, for example, a sphere acted upon by means of a pressure spring 188 is provided opposite the adjusting screw 182 and likewise abuts on the casing surface 174 on a side of the aligning element 172 located opposite the end surface 186.

The sphere 190 acted upon by a spring thus ensures when the tool holder housing 120 is placed on the supporting surfaces 70 and 80 that the end surface 186 always abuts on the casing surface 174 of the aligning element 172 in a manner acted upon by a force and thus the azimuthal position of the tool holder housing 120 can be determined exactly by the adjustment of the end surface 186 by means of rotation of the adjusting screw 182.

The aligning element 172 is preferably seated exactly symmetrical to a center line 92 of the entry channel 90 whereas the clamping member 124, when the tool holder is in place, is arranged with its center axis 129 so as to be laterally offset slightly in relation to the center line 92 and eccentrically to the axis of rotation 134 of the clamping element 132 which intersects the center line 92, namely to the side, to which the beginning 152 of the wedge surface 150 moves during the rotation of the clamping element 132 for clamping the clamping member 124. As a result, tilting moments acting on the tool holder housing 120, which could lead to an uneven abutment of the second supporting areas on the second supporting surfaces, are prevented.

A tool holder 20 is inserted in such a manner that this is first placed against the tool disk 22 due to a movement parallel to the axis 14 such that the clamping member 124 is positioned so as to lie in the entry channel 90, namely between the aligning element 172 and the clamping element 132 with the clamping link member 142. In this respect, the supporting area 100 of the tool holder member 120 likewise comes to rest on the supporting surfaces 70a and 70b on both sides of the entry channel 90. As a result of displacement of the tool holder 20 in an entry direction 176, specified in FIG. 2 in conjunction with the clamping link member 142$_2$, the clamping member 124 can be moved along the insert path 156, which extends parallel to the center line 92 of the entry channel 90, towards the clamping link member 142$_2$ which is aligned with the entry opening 155 in the insert position, so that the clamping member 124 can be brought into an end position by the clamping link member 142$_2$ in the interior 144 surrounded by the clamping link member 142.

If, in this end position, the clamping link member 142$_2$ is rotated in the first direction of rotation 158, the wedge surface 150 acts on the contact surface 128 of the clamping member 124, as already described, in the clamping direction 160.

As a result, the insert path 156 of the clamping member 124 extends, on the one hand, in a straight direction and, on the other hand, essentially exactly radially to the axis 14 and parallel to the plane 72 since the supporting area 100 preferably slides along the supporting surface 70 for such a time until the supporting area 110 rests on the supporting surface 80.

Figure 7:
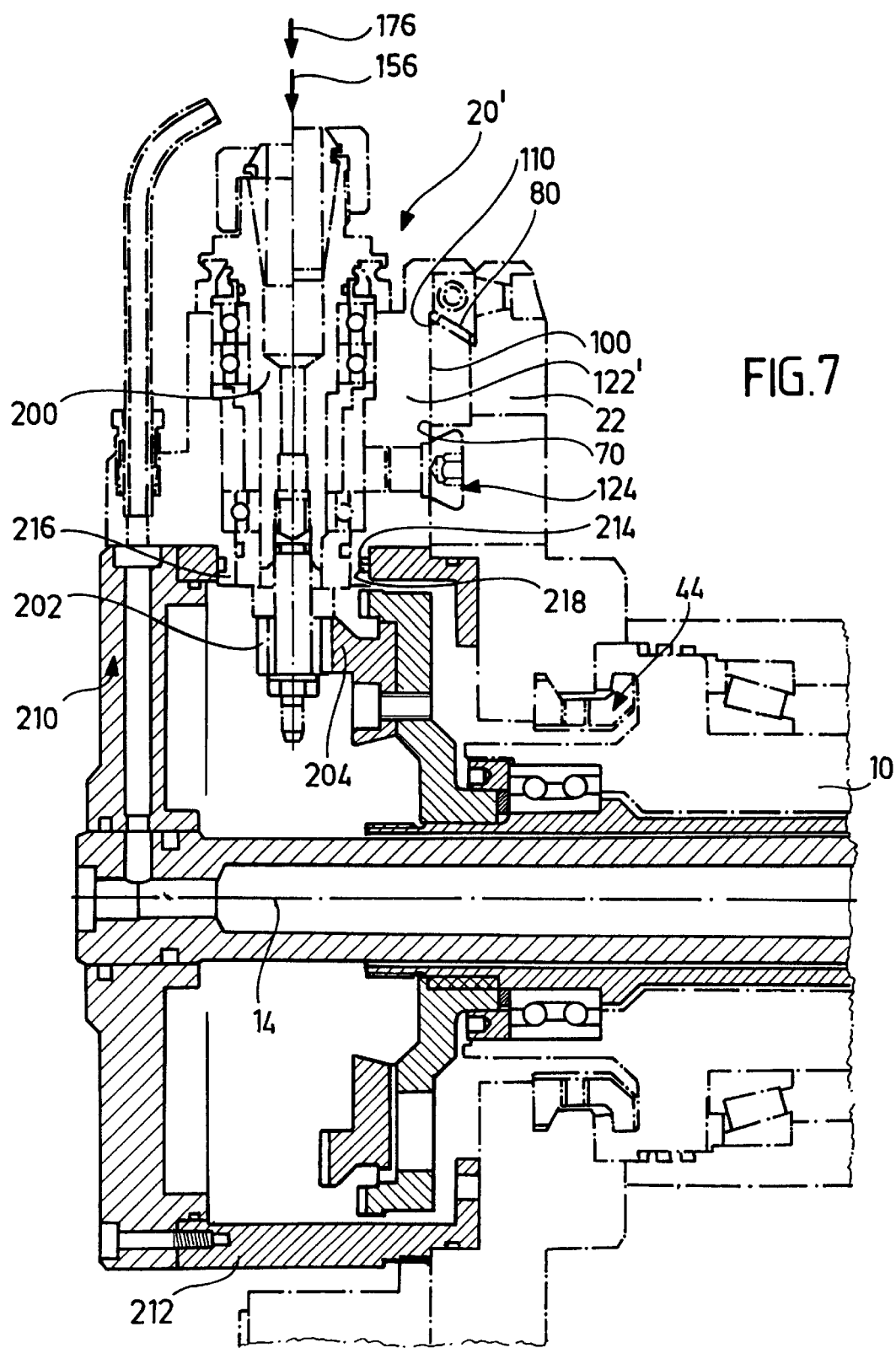
FIG. 7 shows a section similar to FIG. 1 through a variation of the inventive tool support system for rotatingly driven tools.

Such a course of the insert path 156 is particularly advantageous in a variation of the inventive tool support which is illustrated in FIG. 7.

"With this, the tool holders 20' are designed as those for rotating tools and have a tool spindle 200 which is rotatably mounted in the tool holder housing 122' and can be driven via a gear wheel 202 which projects on a side of the tool holder housing 122' facing the axis 14 when a tool holder 20' is inserted and can be driven by a crown wheel 204 which is mounted for rotation about the axis 14 and driven by a separate drive."

The crown wheel 204 is preferably arranged in a tool support housing 210 which has a casing member 212 which extends cylindrically around the axis 14 and in which openings 214 are arranged, into which the tool holder housing 122 can be inserted with a cylindrical attachment 216.

If the opening 214 is shaped exactly in accordance with the outer contour of the cylindrical attachment 216, it is necessary to move the tool holder 20' in a straight line along the insert path 156 in the insert direction 176 and essentially in a radial direction in relation to the axis 14 at least insofar as the cylindrical attachment is inserted into the opening 214. This means that a closure between the opening 214 and the cylindrical attachment 216 which is as sealed as possible can be obtained and this can, for example, be sealed, in addition, by sealing rings 218.

What is claimed is:

1. A tool support for machine tools, comprising:
    a base unit,
    a holding member arranged on the base unit,
    two supporting surfaces extending at an acute angle to one another arranged on said holding member for supporting a tool holder in a first supporting area and a second supporting area when said tool holder is inserted by movement in an insert direction extending parallel to one of said supporting surfaces and transverse to the other of said supporting surfaces,
    a clamping device adapted to act on a clamping member of the tool holder in a clamping direction having a component parallel to said insert direction, said clamping device extending such that the tool holder acts upon the supporting surfaces with the first and the second supporting areas,
    said clamping device comprising a clamping element mounted in the holding member -for rotation about an axis;
    said clamping element bearing a wedge surface movable on a path around said axis for acting on the clamping member,
    said wedge surface engaging over the clamping member proceeding from an insert position during the rotation of the clamping element in a first direction of rotation, and acting upon said clamping member so as to displace it increasingly in the clamping direction.

2. A tool support as defined in claim 1, wherein the clamping element is arranged in an area of the holding member bearing the supporting surfaces.

3. A tool support as defined in claim 1, wherein the clamping element is movable in such a manner that the wedge surface crosses an insert path of the clamping member said insert path extending parallel to said insert direction.

4. A tool support as defined in claim 1, wherein:
    in the insert position of the clamping element, the wedge surface is arranged outside an insert path of the clamping member defined by said member during the insertion of the tool holder into the tool support, and
    the wedge surface extends transversely to the insert path with the area acting upon the clamping member following rotation of the clamping element in the first direction.

5. A tool support as defined in claim 1, wherein:
    the clamping element is arranged such that it is in a position to act on the clamping member introduceable in an entry channel arranged in the holding member, said entry channel being recessed in relation to one of the supporting surfaces.

6. A tool support as defined in claim 1, wherein the holding member is adapted to allow a straight insert path.

7. A tool support as defined in claim 6, wherein the insert path extends parallel to one of the supporting surfaces.

8. A tool support as defined in claim 1, wherein the clamping element is rotatable through an angle of less than 270° for the clamping of the tool holder.

9. A tool support as defined in claim 1, wherein the supporting surfaces and the clamping element are arranged relative to one another in such a manner that abutment of the tool holder with the first and second supporting areas on the corresponding supporting surfaces is due to a movement of the tool holder along a straight insert path and movement of the clamping member into the operative area of the clamping element.

10. A tool support as defined in claim 1, wherein one supporting surface of the holding member has partial surfaces located on both sides of an entry channel for the clamping member extending in an entry direction.

11. A tool support as defined in claim 10, wherein both supporting surfaces are divided and each of the supporting surfaces has partial surfaces located on both sides of the entry channel for the clamping member.

12. A tool support as defined in claim 1, wherein the clamping direction extends parallel to a direction located within the angular area limited by the supporting surfaces.

13. A tool support as defined in claim 1, wherein the holding member is connected to the base unit in a force-locking manner.

14. A tool support as defined in claim 13, wherein:
    the base unit and the holding member are alignable relative to one another in a defined manner by means of form-locking elements, and
    the form-locking elements are fixed in a force-locking manner against any relative movement in relation to one another.

15. A tool support as defined in claim 13, wherein the base unit and the holding member are fixed on one another in a force-locking manner by means of clamping claws engaging on the base unit and on the holding member.

16. A tool support as defined in claim 15, wherein an inclined surface is provided in the area of at least one point of engagement of the clamping claws, the clamping claws generating a force affecting the force locking by means of said surface.

17. A tool support as defined in claim 1, wherein the base unit comprises a support shaft and the holding member comprises a tool disk of a tool turret.

18. A tool support as defined in claim 17, wherein:
    the support shaft is designed as a hollow shaft, and
    the clamping claws are operative in a radial direction of the hollow shaft in order to clamp the tool disk and the hollow shaft in an axial direction.

19. A tool support for machine tools, comprising:
    a base unit,
    a holding member arranged on the base unit,
    two supporting surfaces extending at an acute angle to one another arranged on said holding member for supporting a tool holder in a first supporting area and a second supporting area,
    a first of said supporting surfaces being arranged on a front side of said holding member,
    a clamping device adapted to act on a clamping member of the tool holder in a clamping direction, said clamping device extending such that the tool holder acts upon the supporting surfaces with the first and the second supporting areas,
    said clamping device comprising a clamping element mounted in the holding member for rotation about an axis,
    said clamping element is arranged in the holding member on a side of said first supporting surface located opposite the tool holder and extends to a rear side of said holding member up to an actuating element of said clamping device arranged on said rear side.

20. A tool support for machine tools, comprising:

a base unit, a holding member arranged on the base unit, first and second supporting surfaces extending at an acute angle to one another arranged on said holding member for supporting a tool holder in a first supporting area and a second supporting area, a clamping device adapted to act on a clamping member of the tool holder in a clamping direction, said clamping device extending such that in a clamping position the tool holder acts upon the supporting surfaces with the first and the second supporting areas, said clamping device comprising a clamping element mounted in the holding member for rotation about an axis extending transversely to said first supporting surface, said tool holder when being clamped sliding with said first supporting area on said first supporting surface until said second supporting area rests on said second supporting surface, said clamping element bearing a wedge surface movable on a path around said axis for acting on the clamping member, said wedge surface engaging over the clamping member proceeding from an insert position during the rotation of the clamping element in a first direction of rotation, and acting upon said clamping member so as to displace it increasingly in the clamping direction.

21. A tool support as defined in claim 20, wherein the clamping element is rotatably mounted in a bore passing through the holding member.

22. A tool support for machine tools, comprising:

a base unit, a holding member arranged on the base unit, two supporting surfaces extending at an acute angle to one another arranged on said holding member for supporting a tool holder in a first supporting area and a second supporting area, a clamping device adapted to act on a clamping member of the tool holder in a clamping direction, said clamping device extending such that the tool holder acts upon the supporting surfaces with the first and the second supporting areas, said clamping device comprising a clamping element mounted in the holding member for rotation about an axis;

said clamping element bearing a wedge surface extending around said axis with a varying radial distance and being moveable on a path around said axis for directly acting on the clamping member, said wedge surface engaging over the clamping member proceeding from an insert position during the rotation of the clamping element in a first direction of rotation with a contact surface of said wedge surface acting on said clamping member moving along said wedge surface, so as to displace said clamping member increasingly in the clamping direction.

23. A tool support as defined in claim 22, wherein:

the clamping element comprises a clamping link member bearing the wedge surface; and the clamping link member is bent in the shape of a sickle.

24. A tool support as defined in claim 22, wherein:

the clamping element comprises a clamping link member bearing the wedge surface; and the clamping element has a recess located in front of an initial area of the clamping link member, the clamping member being adapted to be brought through said recess into the operative area of the clamping link member during its movement in an insert direction.

25. A tool support as defined in claim 22, wherein:

the clamping element comprises a clamping link member bearing the wedge surface; and the clamping link member bears the wedge surface on a side facing the axis of the clamping element.

26. A tool support as defined in claim 25, wherein the clamping element comprises a hollow cylinder forming the clamping link member with a wall section.

27. A tool system comprising:

a tool holder with a tool holder housing having a first and a second supporting area extending at an acute angle to one another, said housing being adapted to abut on corresponding supporting surfaces of a holding member of a tool support, said housing bearing a clamping member adapted to be acted on by a clamping device of the tool support during clamping of the tool holder, said tool support comprising:

a base unit, a holding member arranged on the base unit, two supporting surfaces extending at an acute angle to one another arranged on said holding member for supporting a tool holder in a first supporting area and a second supporting area when said tool holder is inserted by movement in an insert direction extending parallel to one of said supporting surfaces and transverse to the other of said supporting surfaces, a clamping device adapted to act on a clamping member of the tool holder in a clamping direction having a component parallel to said insert direction, said clamping device extending such that the tool holder acts upon the supporting surfaces with the first and the second supporting areas, said clamping device comprising a clamping element mounted in the holding member for rotation about an axis; said clamping element bearing a wedge surface movable on a path around said axis for acting on the clamping member, said wedge surface engaging over the clamping member proceeding from an insert position during the rotation of the clamping element in a first direction of rotation, and acting upon said clamping member so as to displace it increasingly in the clamping direction.

28. A tool system as defined in claim 27, wherein:

said supporting areas of said housing are adapted to abut on two supporting surfaces of a holding member of a tool support.

29. A tool system as defined in claim 28, wherein the clamping member projects from one of the supporting areas away from the tool holder housing.

30. A tool system as defined in claim 28, wherein the clamping member has a head with a contact surface tapering conically towards the tool holder housing.

31. A tool system as defined in claim 28, wherein a first one of the supporting areas is formed by a plane surface of the tool holder housing.

32. A tool system as defined in claim 28, wherein the second supporting area is formed by a surface arranged on a nose of the tool holder housing.

33. A tool system as defined in claim 32, wherein the second supporting area is divided into two sections.

34. A tool system as defined in claim 28, wherein said tool holder further comprises an aligning device adapted to be brought into interaction with an aligning element on the tool support.

35. A tool system as defined in claim 34, wherein the aligning device comprises a pre-adjustable adjusting element.

36. A tool system as defined in claim 27, wherein:
   the holding member is provided with an aligning element for the exact positioning of the tool holder, and
   the tool holder has an aligning device adapted to be brought into engagement with the aligning element.

* * * * *